(12) United States Patent
Komatsu et al.

(10) Patent No.: US 9,548,638 B2
(45) Date of Patent: Jan. 17, 2017

(54) ALIGNMENT STAGE

(75) Inventors: Takafumi Komatsu, Tokyo (JP); Katsuya Fukushima, Tokyo (JP)

(73) Assignee: THK CO., LTD., Tokyo (JP)

( * ) Notice: Subject to any disclaimer, the term of this patent is extended or adjusted under 35 U.S.C. 154(b) by 904 days.

(21) Appl. No.: 13/988,430

(22) PCT Filed: Nov. 25, 2011

(86) PCT No.: PCT/JP2011/006564
§ 371 (c)(1),
(2), (4) Date: Jul. 12, 2013

(87) PCT Pub. No.: WO2012/073463
PCT Pub. Date: Jun. 7, 2012

(65) Prior Publication Data
US 2013/0278099 A1    Oct. 24, 2013

(30) Foreign Application Priority Data
Nov. 29, 2010  (JP) .................................. 2010-264771

(51) Int. Cl.
*H02K 7/14* (2006.01)
*H02K 41/03* (2006.01)
(Continued)

(52) U.S. Cl.
CPC ........ *H02K 7/14* (2013.01); *B23Q 1/44* (2013.01); *B23Q 1/623* (2013.01); *H02K 41/03* (2013.01);
(Continued)

(58) Field of Classification Search
CPC ... H02K 41/03; H02K 41/031; H02K 2201/18
See application file for complete search history.

(56) References Cited

U.S. PATENT DOCUMENTS 6,420,809 B1 * 7/2002 Obara ............... F16C 17/02
310/90
6,750,571 B2 * 6/2004 Tominaga ......... G03F 7/70758
250/442.11

FOREIGN PATENT DOCUMENTS

JP       08-099243 A      4/1996
JP       2000-235419 A    8/2000
(Continued)

OTHER PUBLICATIONS

International Search Report of PCT/JP2011/006564, mailing date of Feb. 28, 2012.

*Primary Examiner* — Dang Le
(74) *Attorney, Agent, or Firm* — Westerman, Hattori, Daniels & Adrian, LLP (57) ABSTRACT

An alignment stage including: a base plate; one or more X direction thrust generation guide mechanisms for generating thrust and performing guidance in the direction of a straight line X; a pair of lower plates disposed above the X direction thrust generation guide mechanisms; a pair of upper plates provided corresponding to the lower plates, respectively; a pair of rotatable bearings disposed between the lower plates and the upper plates; one or more Y direction thrust generation guide mechanisms for generating thrust and performing guidance in the direction of a straight line Y perpendicular to the straight line X; and a table plate disposed above the Y direction thrust generation guide mechanisms. With this configuration, it is possible for the alignment stage to be compact and easy to assemble.

9 Claims, 10 Drawing Sheets

(51) Int. Cl.
*B23Q 1/44* (2006.01)
*B23Q 1/62* (2006.01)

(52) U.S. Cl.
CPC ......... *H02K 41/031* (2013.01); *H02K 2201/18* (2013.01)

(56) References Cited

FOREIGN PATENT DOCUMENTS

| | | | |
|---|---|---|---|
| JP | 2006-136991 | A | 6/2006 |
| JP | 2007-266585 | A | 10/2007 |

* cited by examiner

ALIGNMENT STAGE

TECHNICAL FIELD

The present invention relates to an alignment stage that allows a mounted object placed on an upper surface of a table plate to move in the direction of a straight line X, in the direction of a straight line Y, and in the direction of rotation θ using a linear driving source, such as a linear motor, as a driving force source.

BACKGROUND ART

A conventionally known alignment stage is an apparatus capable of moving a mounted object placed on an upper surface of a table plate in the direction of a straight line X, in the direction of a straight line Y (in the direction perpendicular to the X direction), and in the direction of rotation θ on an X-Y plane by using a plurality of actuator modules that generates thrust. The actuator module used in a known alignment stage uses a thrust generation source realized by combining a rotation motor and a ball screw, and a linear guide as a guide mechanism that guides the thrust exerted by the thrust generation source on an X-Y plane (for example, see Patent Literature 1 below). By using a plurality of (for example, three sets of) actuator modules configured from a combination of the thrust generation source formed of the rotation motor and the ball screw, and the linear guide as a guide mechanism, positioning of a mounted object in the direction of a straight line X, in the direction of a straight line Y, and in the direction of rotation θ is realized.

CITATION LIST

Patent Literature

Patent Literature 1: JP 8-99243 A

DISCLOSURE OF THE INVENTION

Problems to be Solved by the Invention

However, in known technologies related to an alignment stage, in order to realize a motion in the direction of a straight line X, in the direction of a straight line Y, and in the direction of rotation θ, a thrust generation source corresponding to each of the X, Y, and θ directions is prepared, and a structure of layering the thrust generation sources for the X, Y, and θ directions is employed. Therefore, the known alignment stage had a problem that the shape of the stage as a whole becomes larger. Therefore, a technology capable of providing a new alignment stage that realizes downsizing, compared with the known technologies, has been sought in industry.

Further, in mounting the three actuator modules concerning the above-described known technology, it is necessary to mount the actuator modules at accurate positions. That is, it is necessary that these three actuator modules be positioned while being mutually balanced because the actuator modules are disposed on the same plane. As described above, the known alignment stage had a lot of difficult restrictions related to an installation condition of configuration members.

The present invention has been made in view of the above-described problems that have existed in the known technologies, and an objective of the present invention is to provide a totally new alignment stage having a configuration for downsizing that has been difficult to realize by the known technologies and having an easy-to assemble configuration.

Means for Solving the Problems

An alignment stage according to the present invention includes: a base plate fixed to a base; one or more X direction thrust generation guide mechanisms disposed on the base plate, and configured to generate thrust and to perform guidance in a direction of a straight line X; a pair of lower plates disposed above the X direction thrust generation guide mechanisms, and configured to horizontally move in the direction of a straight line X; a pair of upper plates provided corresponding to the pair of lower plates, respectively; a pair of rotatable bearings configured to realize relative free movement of the upper plates with respect to the lower plates in a direction of rotation θ by being disposed between respective upper and lower plates of the pair of lower plates and of the pair of upper plates; one or more Y direction thrust generation guide mechanisms disposed above at least one of the pair of upper plates, configured to generate thrust and to perform guidance in a direction of a straight line Y perpendicular to the direction of a straight line X, a plurality of the Y direction thrust generation guide mechanisms being provided when one of the X direction thrust generation guide mechanisms is provided, and one or more Y direction thrust generation guide mechanisms being provided when a plurality of the X direction thrust generation guide mechanisms is provided; and a table plate configured to move a mounted object placed on an upper surface in the direction of a straight line X, in the direction of a straight line Y, and in the direction of rotation θ by being disposed above the Y direction thrust generation guide mechanism.

Effects of the Invention

According to the present invention, a totally new alignment stage having a configuration for downsizing that has been difficult to realize by known technologies and having an easy-to assemble configuration can be provided.

BRIEF DESCRIPTION OF THE DRAWINGS

FIG. 10 is a schematic diagram illustrating a configuration example of the linear motor of the another embodiment illustrated in FIG. 9, especially, FIG. 10(a) illustrates a top view of the linear motor, and FIG. 10(b) illustrates a front view of the linear motor.

BEST MODE FOR CARRYING OUT THE INVENTION

Hereinafter, favorable embodiments for implementing the present invention will be described with reference to the drawings. Note that the embodiments below do not limit the invention concerning the claims, and all combinations of characteristics described in the embodiments are not necessarily indispensable for solution to the problems of the invention.

Figure 1:
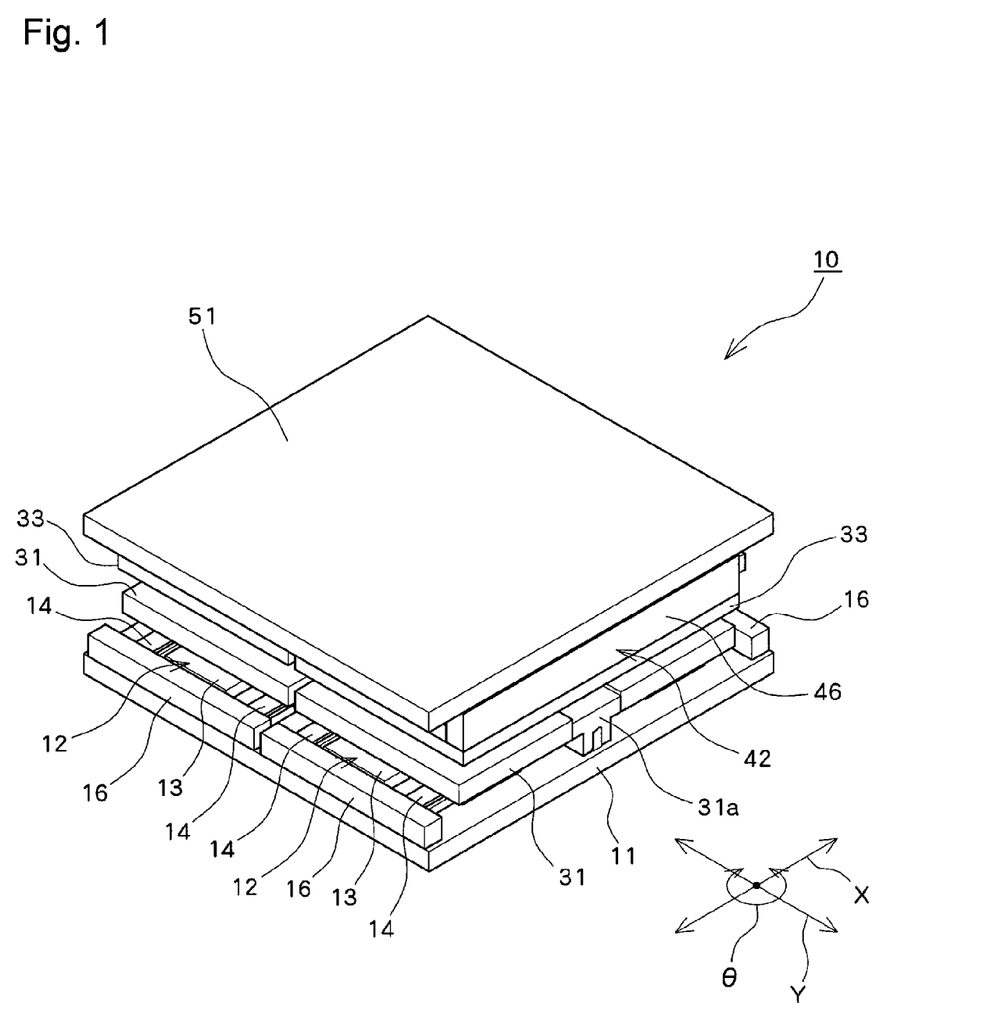
FIG. 1 is a perspective view of an appearance of an alignment stage according to a present embodiment.
Figure 2:
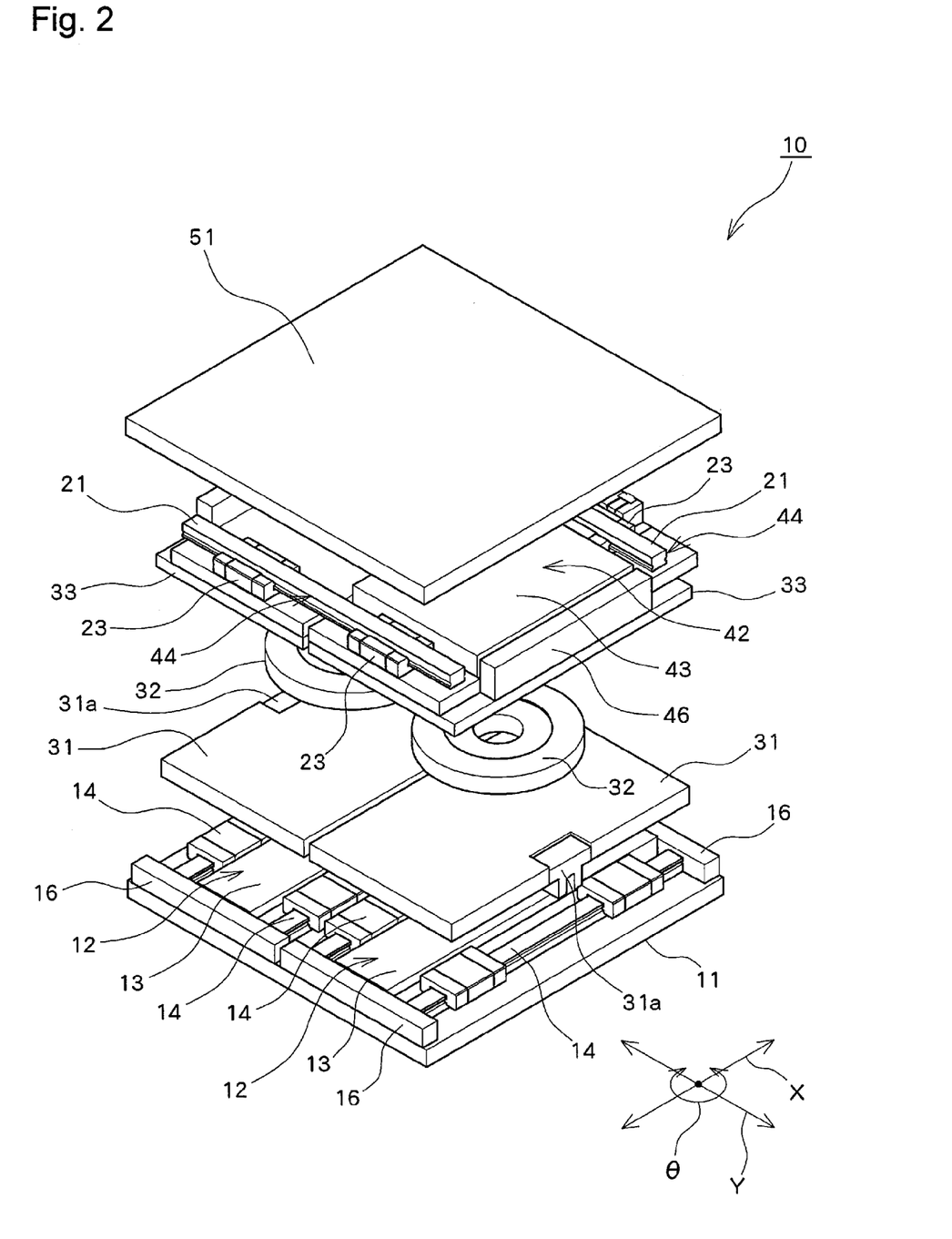
FIG. 2 is an exploded perspective view of components of the alignment stage according to the present embodiment when exploded in the vertical direction.
Figure 3:
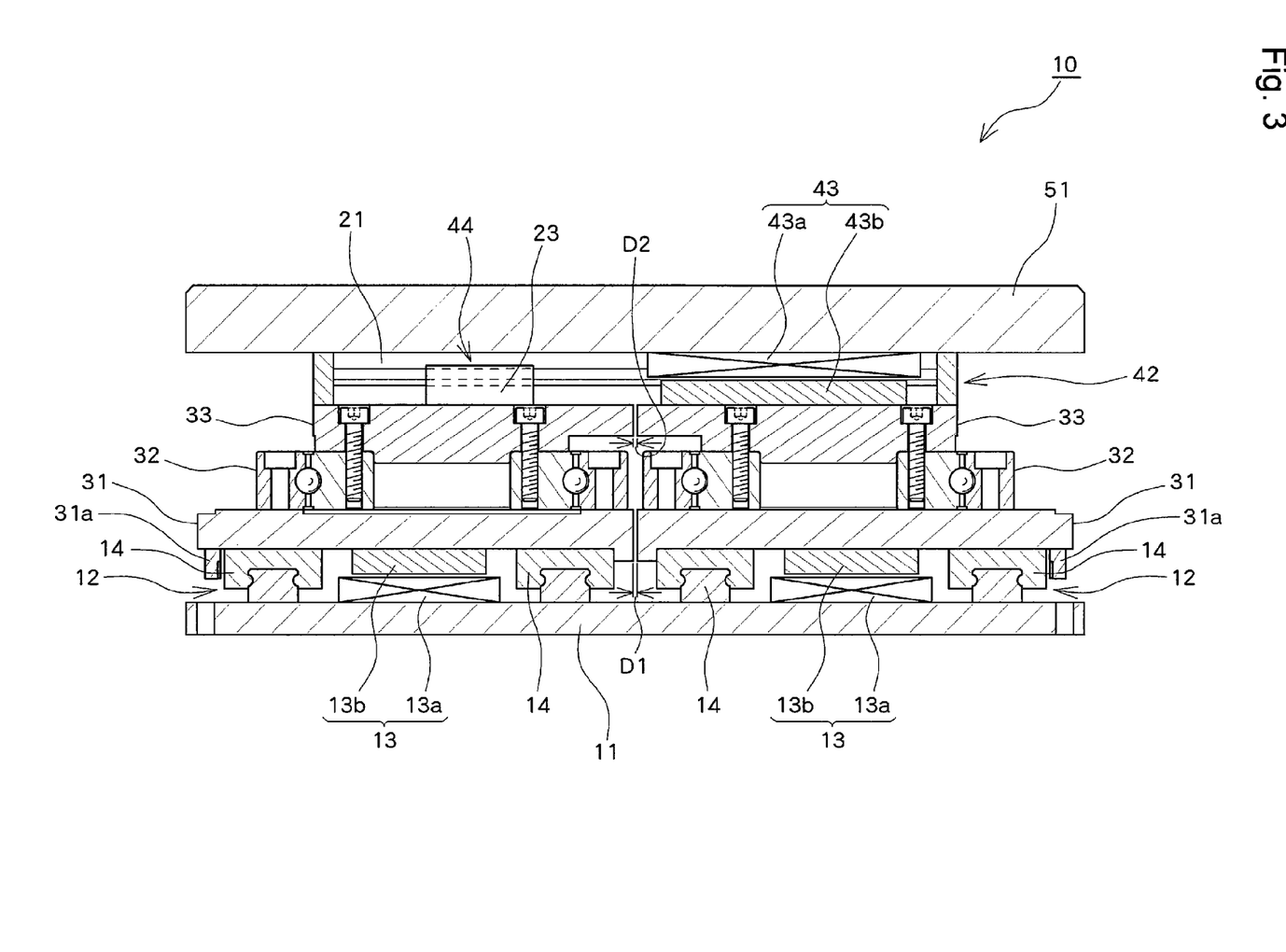
FIG. 3 is a cross sectional view of a central part of the alignment stage according to the present embodiment when viewed with a longitudinal section perpendicular to the direction of a straight line X.

FIG. 1 is a perspective view of an appearance of an alignment stage according to the present embodiment. Further, FIG. 2 is an exploded perspective view of components of the alignment stage according to the present embodiment when exploded in the vertical direction. Further, FIG. 3 is a cross sectional view of a central part of the alignment stage according to the present embodiment when viewed with a longitudinal section perpendicular to the direction of a straight line X.

An alignment stage 10 according to the present embodiment includes a base plate 11 that is a horizontal plate-like member positioned at a lowermost portion. The base plate 11 can be fixed to a base, and serves as a reference member of the alignment stage 10. Note that the base plate 11 of the present embodiment has an approximately square outline shape. However, the outline shape can be any shape.

A pair of X direction thrust generation guide mechanisms 12 and 12 that generate thrust and perform guidance in the direction of a straight line X are disposed above the base plate 11. The pair of X direction thrust generation guide mechanisms 12 and 12 are arranged in parallel with the direction of a straight line X, and both of the X direction thrust generation guide mechanisms 12 and 12 are capable of generating thrust and performing guidance along the direction of a straight line X.

The X direction thrust generation guide mechanism 12 of the present embodiment is configured by combining one linear motor 13 as a linear driving source that serves as a thrust generation source, and two linear guides 14 and 14 as a linear guide unit that serves as a guide mechanism, and further, the two linear guides 14 and 14 are arranged to interpose the one linear motor 13 from both sides.

The linear motor 13 is a synchronous linear motor that generates thrust in the direction of a straight line X, and is configured from a plurality of coil members 13a arranged in line with respect to an upper surface of the base plate 11, and a magnet member 13b fixed to a lower surface of a lower plate 31 described below to face the coil members 13a with a small gap.

The magnet member 13b is arranged to allow N poles and S poles to alternately face the coil members 13a along the direction of a straight line X. Note that the magnet member 13b of the present embodiment is arranged and fixed to the lower plate 31 with an adhesive. However, the magnet member 13b and the lower plate 31 can be integrated by causing the lower plate 31 to be subjected to injection molding.

Meanwhile, the coil member 13a arranged on the base plate 11 is formed by a coil being wound around a core member formed of ferromagnet, such as iron, and a tip of the core member faces the magnet member 13b with a small gap, the magnet member 13b being disposed on the lower plate 31. The coil members 13a are provided corresponding to the u-phase, v-phase, and w-phase of three-phase alternating current, and a set of three coil members 13a generates a shifting magnetic field when applying the three-phase alternating current. Then, magnetic attractive force or magnetic repulsive force acts between the coil members 13a and the magnet member 13b based on the shifting magnetic field generated by these coil members 13a, so that the magnet member 13b can be propelled along the arranged direction of the coil members 13a, that is, the magnet members 13b can be propelled toward the direction of a straight line X. Note that the linear motor 13 of the present embodiment employs a core linear motor. However, the linear motor of the present invention can employ a core-less linear motor. By employing a core-less structure without iron core, smooth propulsive force without cogging force can be obtained even when travelling at low speed.

Further, as illustrated in FIGS. 1 and 2, stopper members 16 are disposed at both end portions of the linear motor 13 in the direction of a straight line X. Therefore, reciprocation of the magnet member 13b in the direction of a straight line X going beyond a range of arrangement of the coil members 13a is physically prevented.

Further, a linear encoder 31a for measuring a drive amount of the X direction thrust generation guide mechanism 12 is disposed on the lower plate 31. As a specific configuration, the linear encoder 31a can be configured from a scale (not illustrated) that serves as a ruler by being formed on an upper surface of the base plate 11, and a head (detector, the member indicated by the reference sign 31a) that detects positional information by being disposed at a central portion of a side surface of the lower plate 31 and being disposed at a position facing the scale (not illustrated). With this linear encoder 31a, a relative movement amount of the lower plate 31 with respect to the base plate 11 can be detected. Further, by combining and using the linear encoder 31a as an electric limit stopper and the stopper members 16 as physical limit stoppers, the safety factor of the alignment stage 10 according to the present embodiment can be further improved. Note that, as for the linear encoder 31a, there are an optical type linear encoder using reflection of light for detection and a magnetic type linear encoder using magnetism, and also there are an absolute type linear encoder for measuring absolute positions and an increment type linear encoder for measuring relative positions. For the linear encoder 31a of the present embodiment, any type linear encoder can be employed according to a use, budget, and the like.

Figure 4:
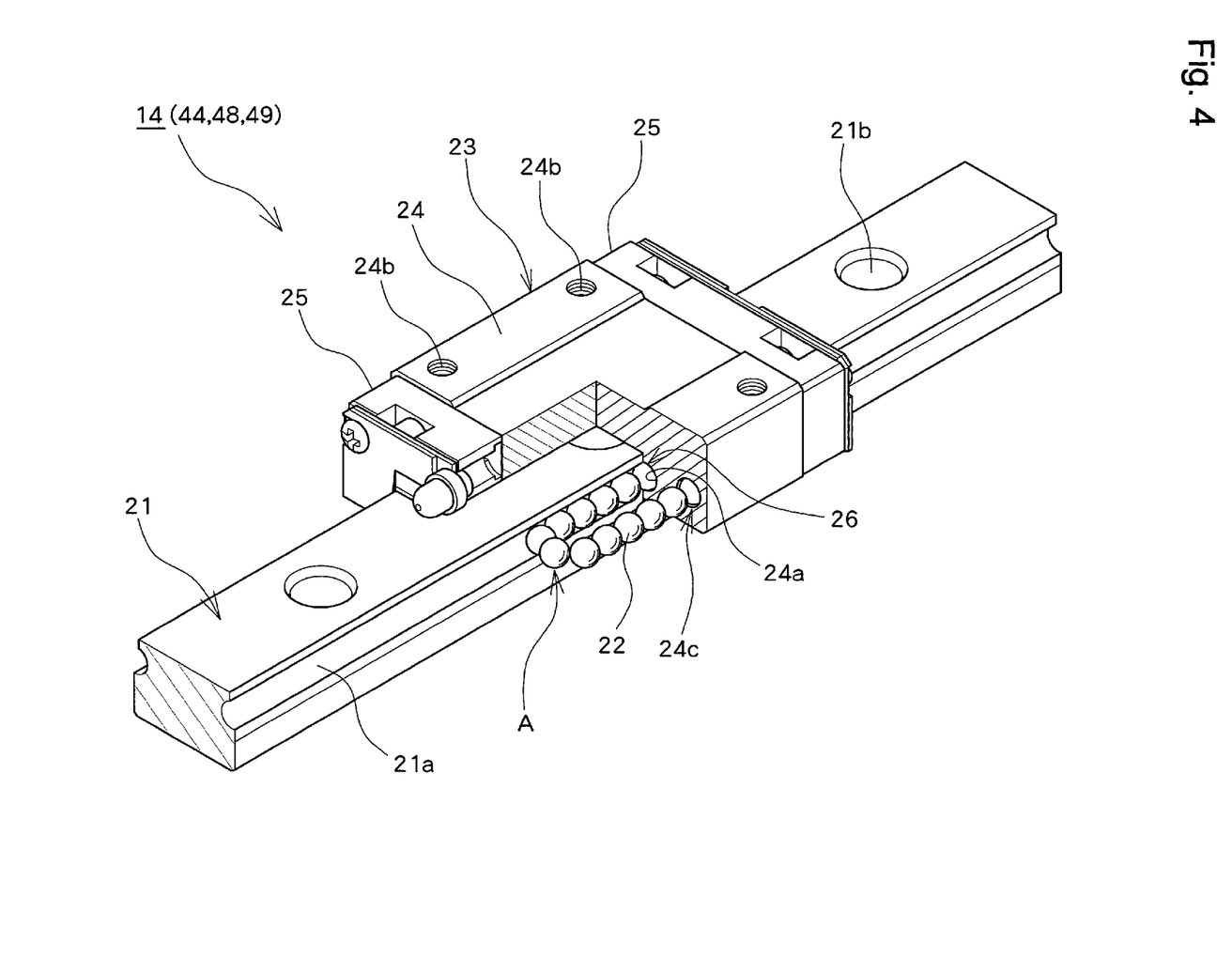
FIG. 4 is a diagram for describing a specific configuration of a linear guide used in the alignment stage according to the present embodiment.

The linear guide 14, which is another member configuring the X direction thrust generation guide mechanism 12, is a member including a track rail 21 as a track member, and a moving block 23 as a moving member movably attached to the track rail 21 via balls 22 as rolling elements, as illustrated in FIG. 4. Note that FIG. 4 is a diagram for describing a specific configuration of a linear guide used in the alignment stage 10 according to the present embodiment.

The track rail 21 is a long member having an approximately rectangular cross section, and has ball rolling grooves 21a that allow the balls 22 to roll formed in both side surfaces throughout the length of the track rail 21. In the case of the linear guide 14 exemplarily illustrated in FIG. 4, one ball rolling groove 21a for each side surface of the track rail 21, i.e., two ball rolling grooves 21*a* in total are formed in the both side surfaces of the track rail 21. A plurality of bolt mounting holes 21*b* is formed in the track rail 21 in the longitudinal direction with appropriate intervals, and the track rail 21 is fixed to the base plate 11 with bolts (not illustrated) screwed into these bolt mounting holes 21*b*.

The moving block 23 is configured from a block body 24 and a pair of side covers 25 and 25. The pair of side covers 25 and 25 are fixed to both ends of the block body 24 with bolts, so that the moving block 23 is complete.

Two load rolling grooves 24*a* respectively facing the two ball rolling grooves 21*a* formed in the track rail 21 are provided in the block body 24. With this combination of the ball rolling grooves 21*a* and the load rolling grooves 24*a*, two load rolling paths 26 are formed between the track rail 21 and the moving block 23. Note that a plurality of female screws 24*b* (only three out of four are drawn in FIG. 4) is formed in the upper surface of the block body 24. The moving block 23 is fixed to the lower surface of the lower plate 31 using these female screws 24*b*.

Two returning paths 24*c* extending in parallel with the load rolling paths 26 are penetrated through and formed in the block body 24. Further, a pair of ball guide parts (not illustrated) protruding between the load rolling groove 24*a* and the returning path 24*c* in an arch like manner are disposed at both end surfaces of the block body 24. Further, ball guide grooves (not illustrated) caving in an arch like manner corresponding to the ball guide parts (not illustrated) are formed in the side covers 25.

By fixing the side covers 25 to the block body 24, the ball guide parts (not illustrated) and the ball guide grooves (not illustrated) are coupled, so that U-shaped direction change paths (a path indicated by the reference sign A in FIG. 4, which realizes turning of the balls 22) for connecting the load rolling paths 26 and the returning paths 24*c* are formed between the ball guide parts and the ball guide grooves. The returning path 24*c* and the direction change path configure no-load rolling path of the balls 22, and the combination of the no-load rolling path and the load rolling path 26 configure an endless circuit.

Since the linear guide 14 according to the present embodiment has such a configuration, the moving block 23 freely reciprocates along the longitudinal direction of the track rail 21.

By the above-described combination of the one linear motor 13 and the two linear guides 14 and 14, the X direction thrust generation guide mechanism 12 of the present embodiment is configured. Note that the X direction thrust generation guide mechanism 12 of the present embodiment is configured and arranged such that the two linear guides 14 and 14 interpose the one linear motor 13 from both sides. Therefore, the thrust to the lower plate 31 and guiding movement can be stably provided.

Further, since the pair of X direction thrust generation guide mechanisms 12 and 12 of the present embodiment are arranged in parallel with the direction of a straight line X, the pair of lower plates 31 and 31 respectively disposed above the mechanisms can be moved into the same direction along the direction of a straight line X or into opposite directions to each other. Note that a gap D1 having a predetermined distance is provided between the plates of the pair of lower plates 31 and 31 respectively disposed above the pair of X direction thrust generation guide mechanisms 12 and 12. With the existence of this gap D1, horizontal movement in the direction of a straight line X is not impeded in the pair of lower plates 31 and 31. Therefore, smooth horizontal movement of the two lower plates 31 and 31 is possible.

As described above, the pair of lower plates 31 and 31 that horizontally move in the direction of a straight line X are respectively provided above the pair of X direction thrust generation guide mechanisms 12 and 12. A pair of rotatable bearings 32 and 32 are respectively disposed above the pair of lower plates 31 and 31. Further, a pair of upper plates 33 and 33 respectively corresponding to the pair of lower plates 31 and 31 are further disposed above the pair of rotatable bearings 32 and 32.

As described above, the rotatable bearing 32 disposed between a pair of the upper and lower plates 31 and 33, as illustrated in FIG. 3, an outer ring of the rotatable bearing 32 is fixed to the lower plate 31, while an inner ring of the rotatable bearing 32 is fixed to the upper plate 33. Since the rotatable bearing 32 of the present embodiment is capable of relative rotation movement in a free state in which the inner and outer rings have no constraint, relative free movement of the upper plate 33 with respect to the lower plate 31 in the direction of rotation θ is possible by the act of the rotatable bearing 32.

Note that a gap D2 having a predetermined distance is provided between the plates of the pair of upper plates 33 and 33 respectively disposed above the pair of rotatable bearings 32. In an initial state, this gap D2 is set to have approximately the same distance as the gap D1 provided between the lower plates 31 and 31, and the gap D2 is configured to change the distance with the opening direction in accordance with movement of the two upper plates 33 and 33 (note that a state change of the gap D2 will be described in detail when describing an operation). Therefore, with the existence of the gap D2, even in the pair of upper plates 33 and 33, movement of the pair of upper plates on the X-Y plane is not impeded when rotationally moving in the direction of rotation θ. Therefore, smooth horizontal movement of the two upper plates 33 and 33 is possible.

Two linear guides 44 as a linear guide unit configured from one track rail 21 and two moving blocks 23 are disposed further above the pair of upper plates 33 and 33. The two linear guides 44 and 44 are disposed such that an axial line direction of the track rail 21 faces the direction of a straight line Y, that is, the axial line direction faces a direction perpendicular to the direction of a straight line X. Further, in each of the two linear guides 44 and 44, the two moving blocks 23 are respectively disposed and fixed to the upper surfaces of the pair of upper plates 33 and 33, while one track rail 21 is disposed and fixed to a lower surface of a table plate 51 described below.

In the present embodiment, one linear motor 43 as a linear driving source that is to be a thrust generation source in the direction of a straight line Y is disposed only above one of the above-described pair of upper plates 33, to be specific, only above the upper plate 33 on the right side on paper in FIG. 2. On the other hand, a linear motor is not disposed above the other upper plate 33 positioned on the left side on paper in FIG. 2, and only one of the two moving blocks 23 included in the linear guide 44 is disposed (that is, since there are two sets of the linear guide 44, two moving blocks 23 are disposed above the other upper plate 33). Therefore, in the present embodiment, an Y direction thrust generation guide mechanism 42 is disposed only above the upper plate 33 on the right side on paper in FIG. 2.

The Y direction thrust generation guide mechanism 42 disposed only above the upper plate 33 on the right side on paper in FIG. 2 is configured from a combination of one linear motor 43 serving as a thrust generation source, two linear guides 44 and 44 serving as a guide mechanism. A structure and a mechanism of the linear motor 43 and the linear guides 44 are the same as the linear motor 13 and the linear guides 14 included in the above-described X direction thrust generation guide mechanism 12, and therefore, description is omitted. However, as for the linear motor 43 included in the Y direction thrust generation guide mechanism 42, as illustrated in FIG. 3, a magnet member 43b that configures the linear motor 43 is disposed on the upper surface of the upper plate 33, and a coil member 43a is disposed on a lower surface of the table plate 51 described below.

Further, the one linear motor 43 and the two linear guides 44 and 44 included in the Y direction thrust generation guide mechanisms 42 are capable of generating thrust and performing guidance in the direction of a straight line Y.

Here, regarding the direction of a straight line X and the direction of a straight line Y illustrated in FIG. 1, any one direction extending in parallel with the reference surface can be defined as the direction of a straight line X, and one direction perpendicular to the direction of a straight line X and extending in parallel with the reference surface can be defined as the direction of a straight line Y, where an installation surface of the base plate 11 is the reference surface and when the reference surface is viewed from above. That is, the direction of a straight line X and the direction of a straight line Y can be grasped on the reference surface and on a surface endlessly existing in the vertical direction of the reference surface.

Further, the direction of a straight line X that is a generating direction and a guiding direction of the thrust realized by the linear motor 13 and the linear guides 14 included in the X direction thrust generation guide mechanism 12, and the direction of a straight line Y that is a generating direction and a guiding direction of the thrust realized by the one linear motor 43 and the two linear guides 44 and 44 included in the Y direction thrust generation guide mechanism 42 are configured to be grasped such that these directions are arranged perpendicular to each other in an initial state when the installation surface of the base plate 11 is viewed from above.

That is, in the present embodiment, the linear guides 14 included in the X direction thrust generation guide mechanism 12 and the linear guides 44 included in the Y direction thrust generation guide mechanism 42 are configured such that the track rails included in the linear guides 14 and 44 are arranged in a parallel-crosses manner in the initial state when the alignment stage 10 is viewed from above.

Meanwhile, as described above, only two linear guides 44 and 44 that are a guide mechanism of the Y direction thrust generation guide mechanism 42 are disposed above the other upper plate 33 positioned on the left side on paper in FIG. 2, and no linear motor is disposed. The two linear guides 44 and 44 positioned above the other upper plate 33 are of course capable of the guiding movement in the direction of a straight line Y.

Note that, as illustrated in FIGS. 1 and 2, stopper members 46 can be disposed at end portions of the linear motor 43 in the direction of a straight line Y, similarly to the case in the direction of a straight line X. With these stopper members 46, reciprocation of the magnet member 43b in the direction of a straight line Y going beyond a range of arrangement of the coil member 43a can be physically prevented. Also in this case, a drive limit of the linear motor 43 can be controllably set by the installment of the linear encoder 31a, and the like, and by the combination of the linear encoder 31a, and the like, and the stopper members 46, the safety factor of the alignment stage 10 according to the present embodiment can be further improved.

The table plate 51 is disposed above the above-described Y direction thrust generation guide mechanisms 42 and the linear guides 44 included therein. The table plate 51 is a horizontal plate-like member arranged at an uppermost position of the alignment stage 10, and is fixed and connected to the track rails 21 of the linear guides 44 included in the Y direction thrust generation guide mechanisms 42. Further, the table plate 51 has an approximately square outline shape similar to the base plate 11 arranged at the lowermost position of the alignment stage 10, and is capable of placing a mounted object on its upper surface. Therefore, by driving and controlling the alignment stage 10 of the present embodiment having the above-described mechanism, the mounted object placed on the table plate 51 is moved in the direction of a straight line X, in the direction of a straight line Y, and in the direction of rotation θ, and can be positioned at a desired position. Note that the outline shape of the table plate 51 can be also formed into any shape.

Figure 5:
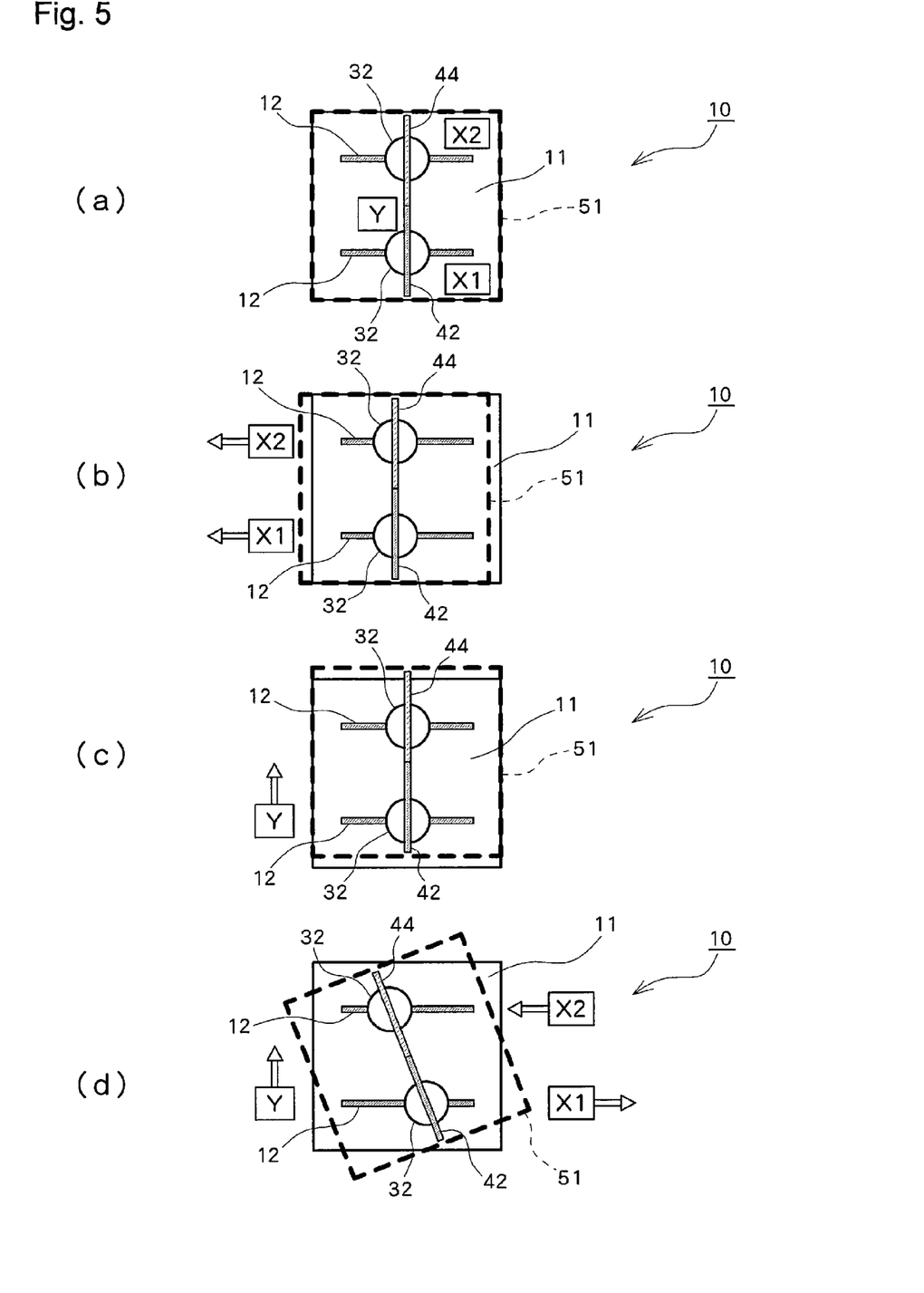
FIG. 5 is a diagram for describing an operation principle of the alignment stage according to the present embodiment.

As described above, a specific configuration of the alignment stage 10 according to the present embodiment has been described. Next, an operation principle of the alignment stage 10 according to the present embodiment will be described with reference to FIG. 5. Here, FIG. 5 is a diagram for describing an operation principle of the alignment stage 10 according to the present embodiment. Note that each of the pair of X direction thrust generation guide mechanisms 12 and 12 that generate thrust and perform guidance in the direction of a straight line X, the Y direction thrust generation guide mechanism 42 that generates thrust and performs guidance in the direction of a straight line Y, and the linear guide 44 that serves as the guide mechanism in the direction of a straight line Y are illustrated in one bold line for the convenience of description.

FIG. 5(a) illustrates an initial state of the alignment stage 10 according to the present embodiment. In the initial state, the base plate 11 and the table plate 51 included in the alignment stage 10 are completely overlapped and arranged so that a deviation amount is not caused in top view.

When it is desired to move the table plate 51 from the initial state illustrated in FIG. 5(a) to the direction of a straight line X, the pair of X direction thrust generation guide mechanisms 12 and 12 may just be driven into an arbitrary direction by an arbitrary movement amount, as illustrated in FIG. 5(b). By the driving operation, the table plate 51 is translated in the direction of a straight line X by an arbitrary movement amount.

Meanwhile, when it is desired to move the table plate 51 in the direction of a straight line Y, the Y direction thrust generation guide mechanism 42 may just be driven into an arbitrary direction by an arbitrary movement amount, as illustrated in FIG. 5(c). By the driving operation, the table plate 51 is translated in the direction of a straight line Y by an arbitrary movement amount.

Further, it is possible to move the table plate 51 in the direction of rotation θ around a plate center as a rotation center. At this time, as illustrated in FIG. 5(d), the pair of X direction thrust generation guide mechanisms 12 and 12 are driven into directions opposite to each other by the same arbitrary movement amount, and the Y direction thrust generation guide mechanism 42 may just be driven by a movement amount corresponding to the movement amount of the pair of X direction thrust generation guide mechanisms 12 and 12. That is, when the pair of X direction thrust generation guide mechanisms 12 and 12 are driven into the directions opposite to each other, the distance between the pair of rotatable bearings 32 and 32 is enlarged. Since the rotatable bearings 32 have the inner and outer rings capable of rotation movement in a free state, the pair of upper plates 33 and 33 respectively connected to the pair of rotatable bearings 32 and 32 are connected to the one table plate 51 through the linear guide 44. Therefore, the rotatable bearings 32 are rotationally moved in the direction of rotation θ in order to maintain the parallel arrangement. As a result of the rotational movement by the pair of upper plates 33 and 33 in the direction of rotation θ, the table plate 51 is rotationally moved in the direction of rotation θ. Note that, in this rotational movement, by translating the table plate 51 by a movement amount corresponding to the movement amount of the pair of X direction thrust generation guide mechanisms 12 and 12 by driving the Y direction thrust generation guide mechanism 42, the rotation center in the direction of rotation θ in the rotational movement is maintained in the plate center of the table plate 51.

Further, in movement of the table plate 51 in the direction of rotation θ around the plate center as a rotation center, movement amounts of the pair of X direction thrust generation guide mechanisms 12 and 12 can be the same. Further, in the linear guide 44 included in the Y direction thrust generation guide mechanism 42, two moving blocks 23 and 23 disposed above the respective upper plates 33 and 33 are moved on the track rail 21 disposed on the lower surface of the table plate 51 so as to change the distance between the moving blocks while maintaining the series arrangement state in the direction of a straight line Y. This shows the alignment stage 10 according to the present embodiment has an easily-driven/controlled configuration, compared with known technologies.

Regarding the movement of the table plate 51 in the direction of rotation θ around the plate center as a rotation center illustrated in FIG. 5(d), the rotation center can be changed by arbitrarily changing the movement amount of the Y direction thrust generation guide mechanism 42 in the direction of a straight line Y. Therefore, any movement operation of the table plate 51 on the X-Y plane can be realized.

Further, as illustrated in FIG. 5(d), when it is desired to move the table plate 51 in the direction of rotation θ, the pair of X direction thrust generation guide mechanisms 12 and 12 are driven in the directions opposite to each other, so that the distance between the pair of rotatable bearings 32 and 32 is enlarged. Therefore, the distance between the pair of upper plates 33 and 33 respectively connected to the pair of rotatable bearings 32 and 32 is also enlarged. That is, in the initial state, the gap D2 (see FIG. 3) existing between the pair of upper plates 33 and 33 is more enlarged as the movement amount in the direction of rotation θ becomes larger. This configuration is invented based on a completely different idea from the structure of known technologies in which modules corresponding to respective X, Y, and θ directions are prepared and these X, Y, and θ modules are layered, and this configuration contributes to realizing a compact alignment stage 10. Note that the pair of upper plates 33 and 33 and the one table plate 51 are connected through the linear guide 44 configured from one track rail 21 and two moving blocks 23 and 23. Therefore, the movement amount in the direction of rotation θ is reliably transferred to the table plate 51.

Note that, as described above, the rotational movement of the table plate 51 in the direction of rotation θ is realized by the pair of X direction thrust generation guide mechanisms 12 and 12 being driven in the directions opposite to each other. As for rotation direction of the table plate 51, clockwise direction or counterclockwise direction can be selected by changing opposite driving directions by the pair of X direction thrust generation guide mechanisms 12 and 12. That is, as illustrated in FIG. 5(d), when the X direction thrust generation guide mechanism 12 on the upper side on paper is driven to the left side of the paper, and, on the contrary, the X direction thrust generation guide mechanism 12 on the lower side on paper is driven to the right side on paper, the table plate 51 is rotationally moved in the counterclockwise direction. Also, obviously, when the X direction thrust generation guide mechanism 12 on the upper side on paper is driven to the right side on paper, and, on the contrary, the X direction thrust generation guide mechanisms 12 on the lower side on paper is driven to the left side on paper, the table plate 51 is rotationally moved in the clockwise direction.

While a favorable embodiment of the present invention has been described, the technical scope of the present invention is not limited by the scope written in the above-described embodiment. Various modifications and improvements can be added to the above-described embodiment.

Figure 6:
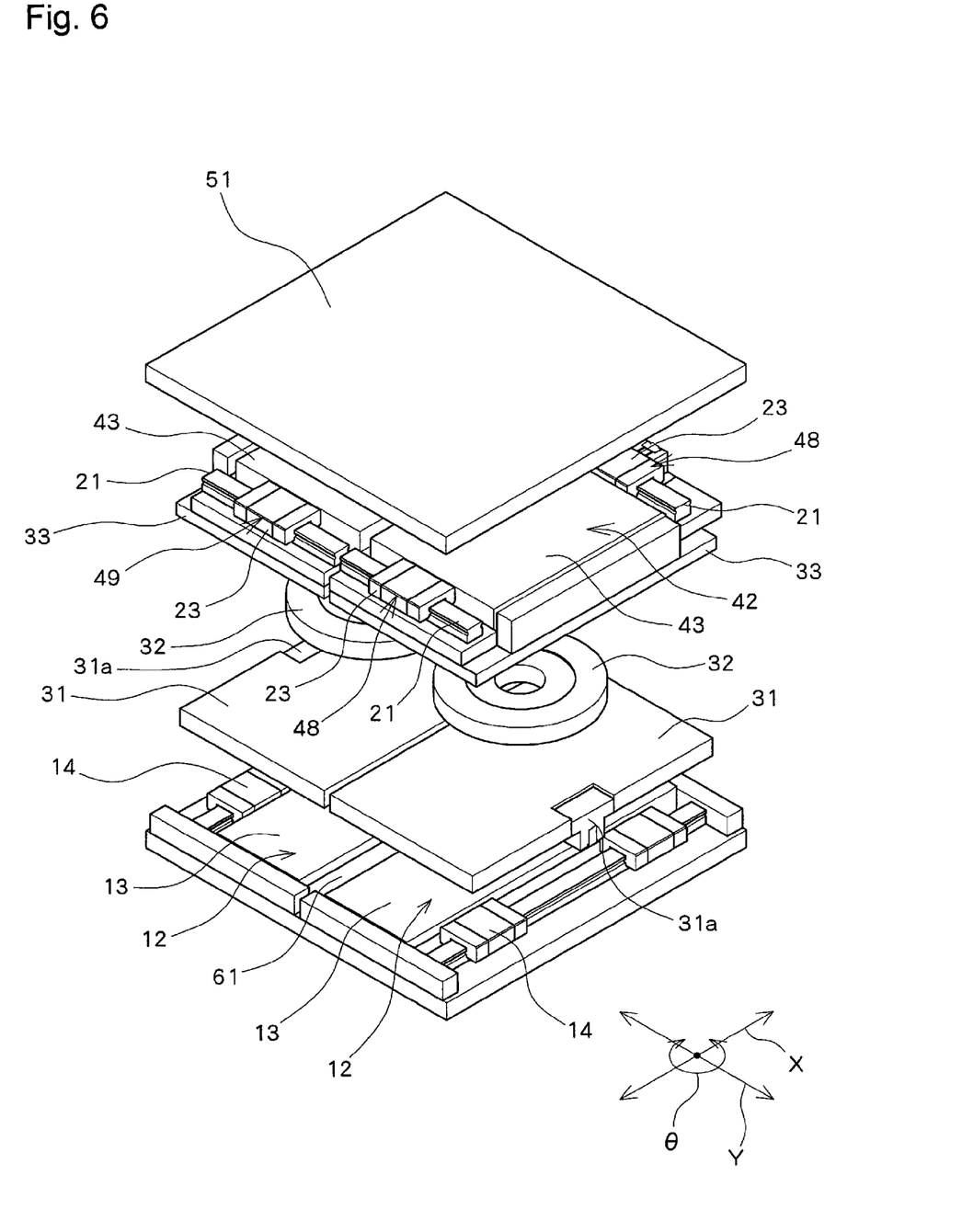
FIG. 6 is a diagram exemplarily illustrating another embodiment that may be employed by the alignment stage according to the present invention.

For example, FIG. 6 is a diagram exemplarily illustrating another embodiment that may be employed by the alignment stage according to the present invention. In the alignment stage 10 of the above-described embodiment, the X direction thrust generation guide mechanism 12 disposed above the base plate 11 is configured from a combination of the one linear motor 13 serving as a thrust generation source and the two linear guides 14 and 14 serving as a guide mechanism, and further, a configuration in which the two linear guides 14 and 14 are arranged to interpose the one linear motor 13 from both sides. However, an X direction thrust generation guide mechanism 12 can also be configured from a combination of one linear motor 13 and one linear guide 14, as illustrated in FIG. 6. Note that, as exemplarily illustrated in FIG. 6, when the X direction thrust generation guide mechanism 12 is configured from one linear motor 13 and one linear guide 14, the linear motors 13 and 13 of the X direction thrust generation guide mechanisms 12 and 12 arranged in parallel may sometimes come close to each other. In such a case, mutual shifting magnetic fields may affect each other. Therefore, when an X direction thrust generation guide mechanism 12 like the one exemplarily illustrated in FIG. 6 is employed, it is favorable to provide a magnetic shielding 61 for shielding an effect of magnetic field generated from the adjacent linear motors 13 and 13. The magnetic shielding 61 can shield the effect of the adjacent magnetic field by using a magnetic body formed of metal material, such as iron.

Also, mounting relation between the plurality of linear guides 14 and 44 used in the alignment stage 10 of the above-described embodiment can be arbitrarily changed. For example, as illustrated in a modification in FIG. 6, regarding the linear guide 44 disposed between the pair of upper plates 33 and 33 and the table plate 51, the track rail 21 as a track member may be disposed on a side of the upper plates 33 and 33 and the moving block 23 as a moving member may be disposed on a side of the table plate 51, contrary to the case of the above-described embodiment. The modification of the installation example can be applied to other linear guides 14.

Note that the modification illustrated in FIG. 6 has a configuration in which track rails 21 are disposed above upper plates 33, a gap D2 existing between the plates 33 being changed. Therefore, in this case, it is configured such that two divided track rails 21 are disposed on each of the two upper plates 33 and 33. That is, two sets of a linear guide 48 made of one track rail 21 and one moving block 23 are disposed at one upper plate 33 positioned on the right side on paper in FIG. 6, and two sets of a linear guide 49 made of one track rail 21 and one moving block 23 are disposed at the other upper plate 33 positioned on the left side as on paper in FIG. 6. In this way, the linear guide serving as a guide mechanism can be configured as the two linear guides 48 and 49 that are divided into two in a series direction. These two linear guides 48 and 49 arranged in series constantly maintain the series arrangement state in the direction of a straight line Y. Therefore, an alignment stage of the another embodiment capable of realizing similar operation to the alignment stage 10 of the above-described embodiment becomes possible.

However, since the linear guides 48 and 49 exemplarily illustrated in FIG. 6 need to install two track rails 21 in a series direction along the direction of a straight line Y, there is a possibility that an installation error is caused between the two track rails 21. Meanwhile, like the linear guide 44 of the above-described embodiment, a configuration that includes only one track rail 21 is favorable because there is no possibility of causing an installation error. Further, a case of disposing only one long track rail can dispose the track rail straighter than a case of disposing a plurality of short track rails. Therefore, the linear guide 44 in the above-described embodiment has an advantage in terms of installability, compared with the linear guides 48 and 49 exemplarily illustrated in FIG. 6. Further, in the above-described embodiment, one track rail 21 is disposed at a lower surface side of one table plate 51. Therefore, the number of parts can be reduced and the manufacturing cost can be reduced. Therefore, it is more favorable.

Further, in the alignment stage 10 of the above-described embodiment, the Y direction thrust generation guide mechanism 42 is provided only above one upper plate 33. However, the Y direction thrust generation guide mechanism 42 can be disposed at both upper surfaces of the pair of upper plates 33. That is, as illustrated in FIG. 6, it is possible to employ a configuration in which a linear motor 43 is added above the other upper plate 33 on the left side on paper in FIG. 6 of the alignment stage 10 of the above-described embodiment. As described with reference to FIG. 5, from a standpoint of the operation principle of the alignment stage according to the present invention, it is only necessary to dispose the linear motor 43, serving as a thrust generation source, at one of the upper plates 33. However, by respectively disposing the linear motors 43 and 43 at the both upper surfaces of the pair of upper plates 33, the thrust in the direction of a straight line Y can be improved, and therefore, it is more favorable.

Figure 7:
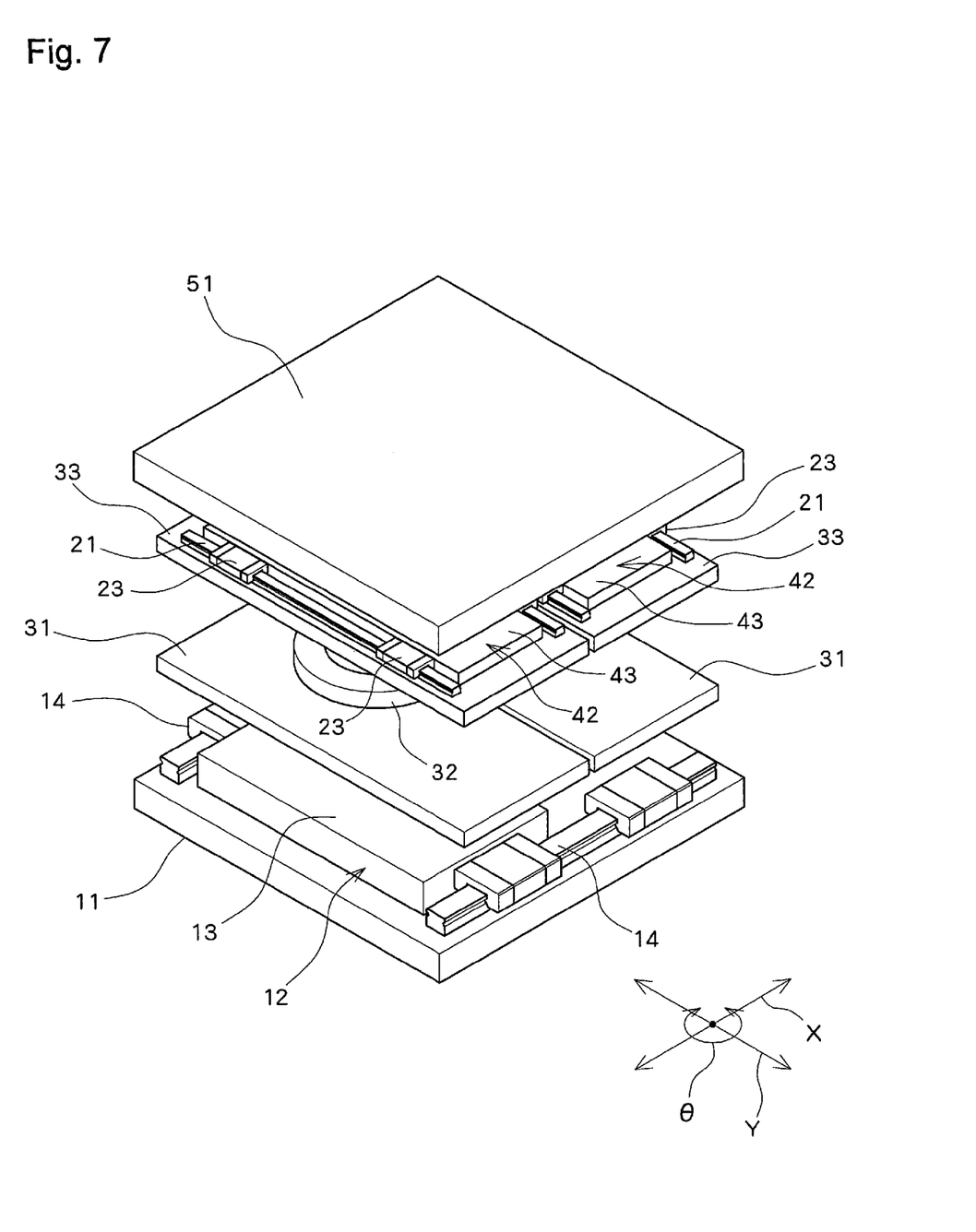
FIG. 7 is a diagram exemplarily illustrating still another embodiment that may be employed by the alignment stage according to the present invention.

Still further, the alignment stage 10 of the above-described embodiment employs a configuration in which the pair of lower plates 31 can be moved in directions opposite to each other by the pair of X direction thrust generation guide mechanisms 12 and 12 disposed immediately above the base plate 11 being driven in the directions opposite to each other. Therefore, the Y direction thrust generation guide mechanism 42 disposed immediately below the table plate 51 is driven only in a single direction in accordance with the driving state of the pair of X direction thrust generation guide mechanisms 12 and 12. However, the present invention can employ a configuration in which the operations of the thrust generation guide mechanisms are interchanged between the X direction and the Y direction. That is, as exemplarily illustrated in FIG. 7, a configuration in which one X direction thrust generation guide mechanism 12 is disposed immediately above the base plate 11, and two Y direction thrust generation guide mechanisms 42 and 42 are disposed immediately below the table plate 51 can be employed. That is, an alignment stage exemplarily illustrated in FIG. 7 is provided with a configuration in which the X direction thrust generation guide mechanisms 12 and the Y direction thrust generation guide mechanism 42 in the internal mechanism of the alignment stage 10 of the embodiment illustrated in FIG. 2 are interchanged.

Here, an operation of the alignment stage illustrated in FIG. 7 will be described with reference to FIG. 8. FIG. 8(a) illustrates an initial state of the alignment stage illustrated in FIG. 7. In the initial state, the base plate 11 and the table plate 51 included in the alignment stage are completely overlapped and arranged so that no deviation amount is caused in top view.

Figure 8:
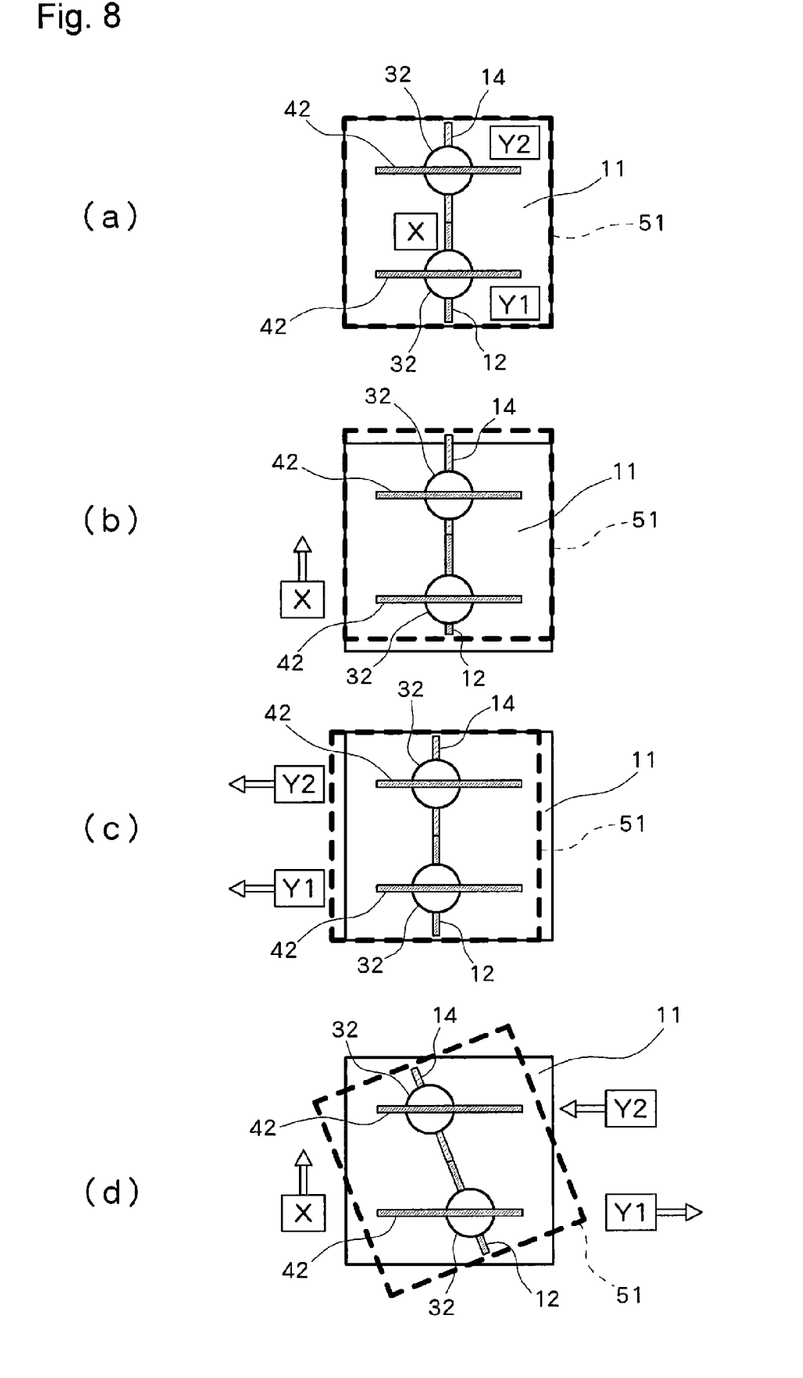
FIG. 8 is a diagram for describing an operation of the alignment stage according to the still another embodiment exemplarily illustrated in FIG. 7.

When it is desired to move the table plate 51 from the initial state illustrated in FIG. 8(a) to the direction of a straight line X, as illustrated in FIG. 8(b), one X direction thrust generation guide mechanisms 12 may just be driven in an arbitrary direction by an arbitrary movement amount. With the driving operation, the table plate 51 is translated in the direction of a straight line X by the arbitrary movement amount.

Meanwhile, when it is desired to move the table plate 51 in the direction of a straight line Y, as illustrated in FIG. 8(c), the pair of Y direction thrust generation guide mechanisms 42 and 42 may just be driven in the same arbitrary direction by an arbitrary movement amount. By the driving operation, the table plate 51 is translated in the direction of a straight line Y by an arbitrary movement amount.

Further, the table plate 51 can be moved in the direction of rotation θ around a plate center of the table plate 51 as a rotation center. At this time, as illustrated in FIG. 8(d), the pair of Y direction thrust generation guide mechanisms 42 and 42 are driven in directions opposite to each other by an arbitrary movement amount, and the X direction thrust generation guide mechanism 12 may just be driven by an movement amount corresponding to the movement amount of the pair of Y direction thrust generation guide mechanisms 42 and 42. That is, when the pair of Y direction thrust generation guide mechanisms 42 and 42 are driven in the direction opposite to each other, the distance between the pair of rotatable bearings 32 and 32 is enlarged. Since the rotatable bearing 32 has inner and outer rings capable of rotation movement in a free state, the pair of lower plates 31 and 31 respectively connected to the pair of rotatable bearings 32 and 32 are connected to one base plate 11 through the two linear guides 14 and 14. Therefore, the rotatable bearings 32 are rotationally moved in the direction of rotation θ in order to maintain the parallel arrangement. As a result of the rotational movement of the pair of lower plates 31 and 31 in the direction of rotation θ, the member group disposed above the pair of lower plates 31 and 31 including the table plate 51 is rotationally moved in the direction of rotation θ. Note that, in this rotational movement, the rotation center in the rotational movement in the direction of rotation θ is maintained in the plate center of the table plate 51 by translating the member group disposed above the pair of lower plates 31 and 31 including the table plate 51 by a movement amount corresponding to the movement amount of the pair of Y direction thrust generation guide mechanisms 42 and 42 by driving the X direction thrust generation guide mechanism 12. Note that, as for the alignment stage illustrated in FIG. 7, in the movement of the table plate 51 in the direction of rotation θ around the plate center as a rotation center, movement amounts of the pair of Y direction thrust generation guide mechanisms 42 and 42 in the opposite directions can be the same, similarly to the alignment stage 10 of the above-described embodiment.

Figure 9:
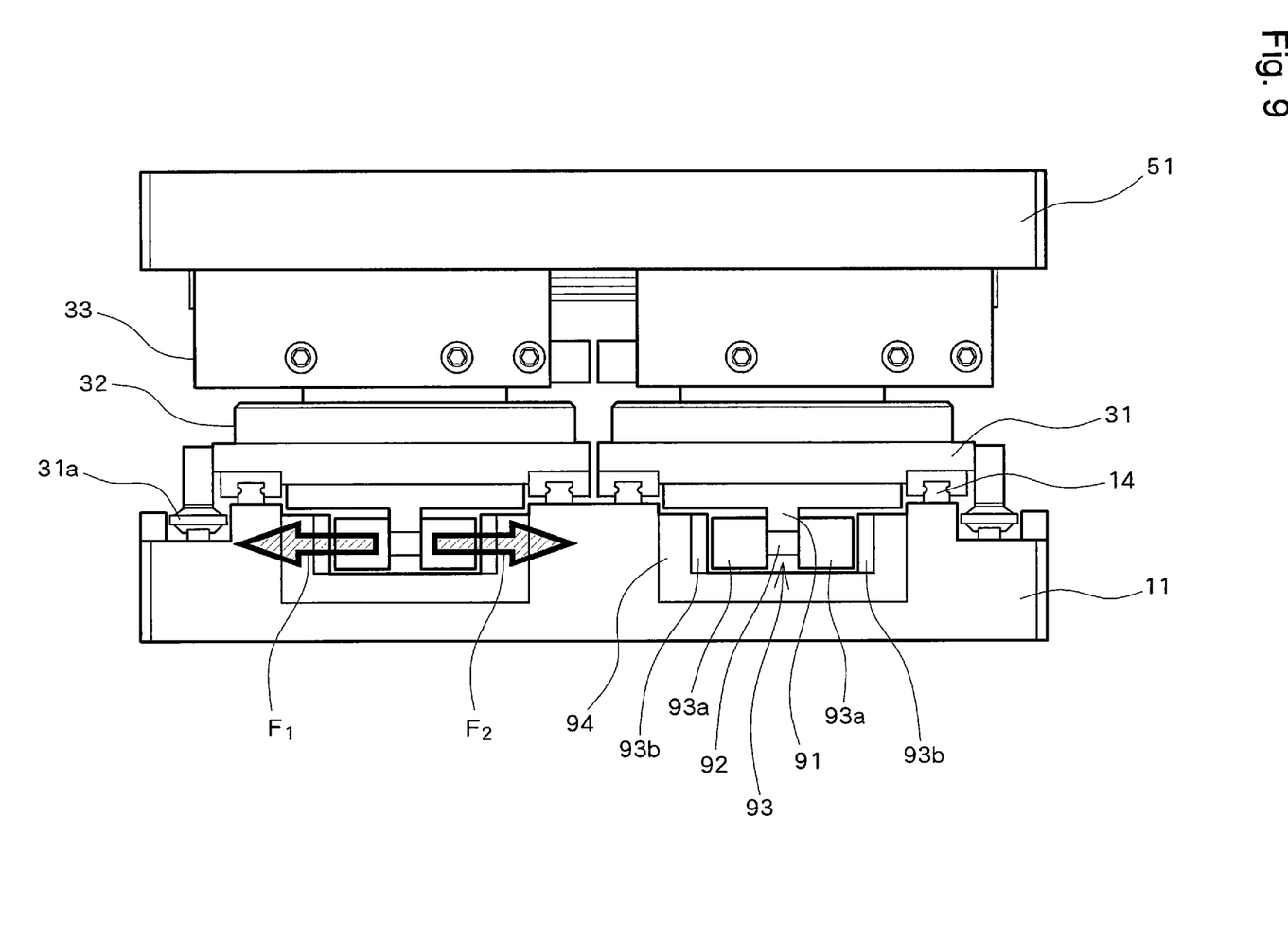
FIG. 9 is a cross sectional view for describing an alignment stage as another embodiment that includes another linear motor different from that of the present embodiment.
Figure 10:
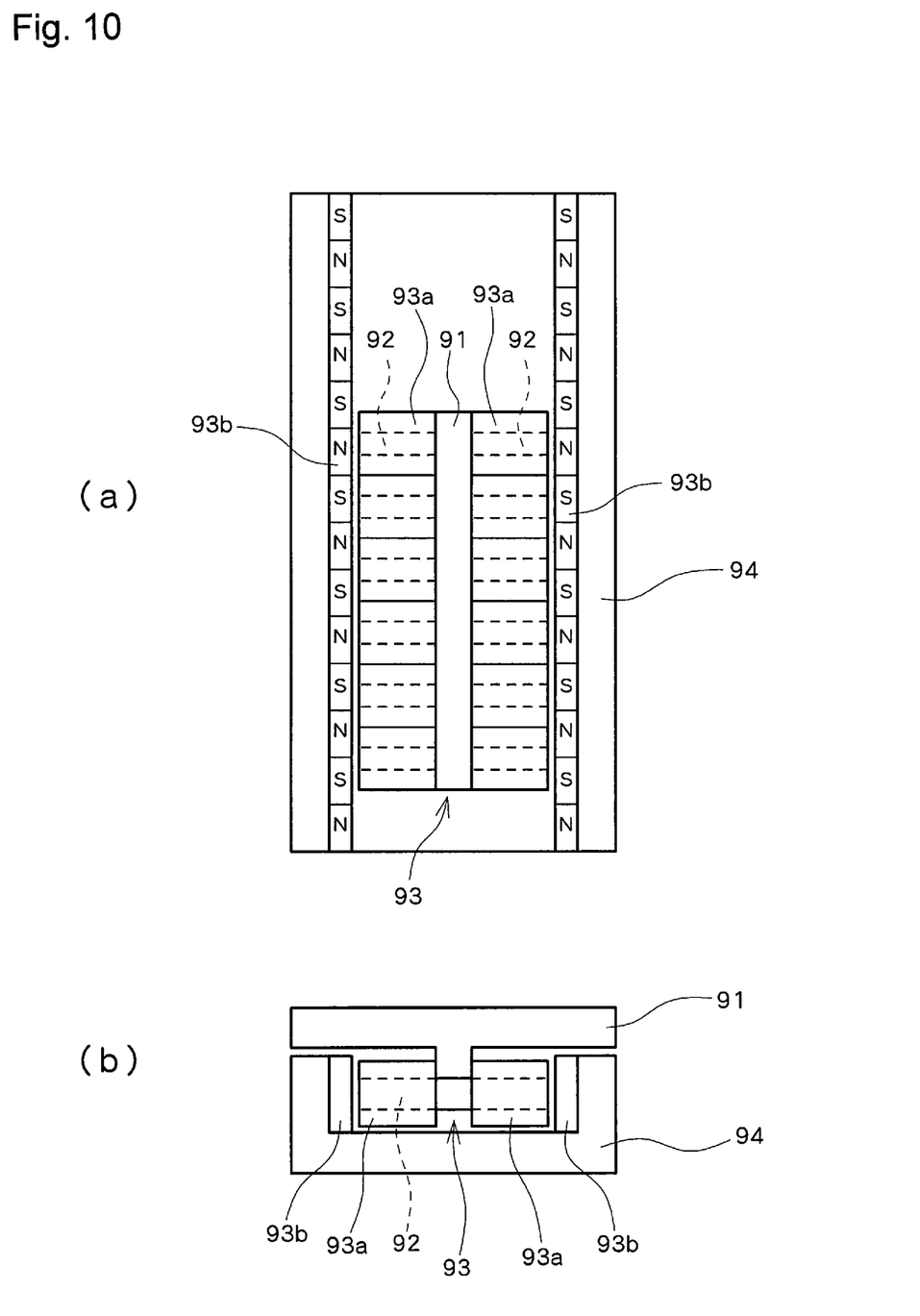

In the above-described embodiment, the linear motor disposed at the alignment stage according to the present invention may employ a core linear motor 13 or a core-less linear motor. However, in the linear motors 13 and 43 according to the present embodiment in which the coil members 13a and 43a and the magnet members 13b and 43b are arranged in the up and down direction, attractive force irrelevant to propulsive force may work between the coil members 13a and 43a and the magnet members 13b and 43b in the up and down direction. This attractive force in the up and down direction does not become a problem when large propulsive force is not required. However, in a case where an alignment stage is used for use that requires some large propulsive force, the propulsive force provides a load to the linear guides 14, 44, 48, and 49 disposed in the vicinity of the linear motors 13 and 43, and may sometimes negatively affect a life of equipment. Therefore, the alignment stage according to the present invention, as illustrated in FIGS. 9 and 10, can employ a linear motor having a configuration that does not generate attractive force in the up and direction. Here, FIG. 9 is a cross sectional view for describing an alignment stage as another embodiment having a linear motor different from the present embodiment. FIG. 10 is a schematic diagram illustrating a configuration example of the different linear motor illustrated in FIG. 9, especially, FIG. 10(a) illustrates a top view of the linear motor, and FIG. 10(b) illustrates a front view of the linear motor.

As illustrated in FIGS. 9 and 10, a linear motor 93 according to another embodiment includes a mounting member 91 disposed at a lower surface side of the lower plate 31, a core iron core 92 protruding in the right and left direction so as to extend in the horizontal direction with respect to the mounting member 91, and a coil member 93a formed by being wound around right and left both end portions of the core iron core 92. Note that a plurality of coil members 93a is arranged in a propulsion direction of the linear motor 93, as illustrated in FIG. 10(a).

Further, as illustrated in FIG. 9 and the like, a plurality of magnet members 93b is arranged to face the coil members 93a formed in the right and left direction with respect to the mounting member 91 with a small gap. The plurality of magnet members 93b is arranged in two lines on a wall surface in an inner side of a long concave-shape yoke 94 that extends in the propulsion direction and is disposed at an upper surface of the base plate 11. Especially, the magnet members 93b are arranged such that N poles and S poles alternately face the coil members 93a along the propulsion direction of the linear motor 93. Note that the magnet members 93b are arranged and fixed to the yoke 94 with an adhesive. However, the magnet members 93b can be integrated with other members like the yoke 94 by causing the other members to be subjected to injection molding.

Further, the coil members 93a are provided corresponding to the u-phase, v-phase, w-phase of the three-phase alternating current, and a set of three coil members 93a generates a shifting magnetic field when applying the three-phase alternating current. Then, magnetic attractive force or magnetic repulsive force acts between the coil members 93a and the magnet members 93b based on the shifting magnetic field generated by these coil members 93a, so that the coil members 93a can be propelled along an arranged direction of the magnet members 93b, that is, the coil members 93a can be propelled toward the propulsion direction of the linear motor 93.

As described above, the linear motor 93 according to the another embodiment illustrated in FIGS. 9 and 10 has a configuration in which two coil members 93a are arranged in two lines inside the magnet members 93b arranged in two lines on the two wall surfaces in the inside of the yoke 94. Therefore, attractive force irrelevant to the propulsive force generated between the magnet members 93b and the coil members 93a is generated toward the right and left direction on paper, as illustrated with the reference signs $F_1$ and $F_2$ in FIG. 9. At this time, in the linear motor 93 according to the another embodiment, two sets of an attractive force generation source configured from the magnet members 93b and the coil members 93a are arranged in the right and left direction. Therefore, the attractive force $F_1$ and $F_2$ generated in the two sets in the right and left direction are generated in opposite directions so as to negate each other. Therefore, according to the linear motor 93 of the another embodiment illustrated in FIGS. 9 and 10, force other than the propulsive force exerted on other members, such as the linear guides 14, 44, 48, and 49 is remarkably few. Therefore, for example, it becomes possible to obtain an effect, such as a long life of equipment.

Still further, although a case has been exemplarily illustrated in which the plurality of linear guides 14, 44, 48, and 49 used in the alignment stage 10 of the above-described embodiment has the two endless circuits and uses the balls 22 as the rolling element, a linear guide applicable to the present invention can be appropriately changed to a linear guide using a roller as the rolling element, for example, as long as similar effects to the above-described embodiment can be shown.

Still further, although, in the alignment stage 10 of the above-described embodiments, a case of employing the linear motors 13 and 43 as the linear driving source has been exemplarily illustrated, other linear driving sources can be employed in place of the linear motors 13 and 43, as long as similar driving force can be shown. To be specific, a linear driving source configured from a combination of a ball screw and a rotation motor or a linear driving source configured from a combination of a belt and a motor can be applied to the alignment state of the present invention.

Note that the above-described embodiments and modifications related to the present invention have not listed all characteristics necessary for the present invention, and subcombinations of these characteristic groups may be the invention. It is clear from the description of the claims that embodiments to which such alternations and improvements are applied may be included in the technical scope of the present invention.

10 Alignment stage, 11 Base plate, 12 X direction thrust generation guide mechanisms, 13 and 43 Linear motor, 13a and 43a Coil member, 13b and 43b Magnet member, 14, 44, 48, and 49 Linear guide, 16 Stopper member, 21 Track rail, 21a Ball rolling groove, 21b Bolt mounting hole, 22 Ball, 23 Moving block, 24 Block body, 24a Load rolling groove, 24b Female screw, 24c Returning path, 25 Side cover, 26 Load rolling path, 31 Lower plate, 31a Linear encoder, 32 Rotatable bearing, 33 Upper plate, 42 Y direction thrust generation guide mechanism, 46 Stopper member, 51 Table plate, Magnetic shielding, 91 Mounting member, 92 Core iron core, Linear motor, 93a Coil member, 93b Magnet member, 94 Yoke, $F_1$ and $F_2$ Attractive force.

The invention claimed is:
1. An alignment stage, comprising:
a base plate fixed to a base;
one or more X direction thrust generation guide mechanisms disposed on the base plate, and configured to generate thrust and to perform guidance in a direction of a straight line X;

a pair of lower plates disposed above the X direction thrust generation guide mechanisms, and configured to horizontally move in the direction of a straight line X;

a pair of upper plates provided corresponding to the pair of lower plates, respectively;

a pair of rotatable bearings configured to realize relative free movement of the upper plates with respect to the lower plates in a direction of rotation θ by being disposed between respective upper and lower plates of the pair of lower plates and of the pair of upper plates;

one or more Y direction thrust generation guide mechanisms disposed above at least one of the pair of upper plates, configured to generate thrust and to perform guidance in a direction of a straight line Y perpendicular to the direction of a straight line X, a plurality of the Y direction thrust generation guide mechanisms being provided when one of the X direction thrust generation guide mechanisms is provided, and one or more Y direction thrust generation guide mechanism being provided when a plurality of the X direction thrust generation guide mechanisms is provided; and a table plate configured to move a mounted object placed on an upper surface in the direction of a straight line X, in the direction of a straight line Y, and in the direction of rotation θ by being disposed above the Y direction thrust generation guide mechanism, and in an initial state, the base plate and the table plate are completely overlapped and arranged so that a deviation amount is not caused in a top view.

2. The alignment stage according to claim 1, wherein a gap is provided between plates of at least one of the pair of lower plates and the pair of upper plates.

3. The alignment stage according to claim 1, wherein each of the X direction thrust generation guide mechanism and the Y direction thrust generation guide mechanism is configured by combining one linear driving source serving as a thrust generation source, and two linear guide units serving as a guide mechanism, and further, the two linear guide units are arranged to interpose the one linear driving source from both sides.

4. The alignment stage according to claim 1, wherein the X direction thrust generation guide mechanisms are disposed below the pair of lower plates, respectively.

5. The alignment stage according to claim 1, wherein the X direction thrust generation guide mechanism is disposed only below one of the pair of lower plates, and only a linear guide unit serving as a guide mechanism is disposed below the other of the pair of lower plates.

6. The alignment stage according to claim 1, wherein the Y direction thrust generation guide mechanism is disposed only above one of the pair of upper plates, and only a linear guide unit serving as a guide mechanism is disposed above the other of the pair of upper plates.

7. The alignment stage according to claim 1, wherein the Y direction thrust generation guide mechanisms are disposed above the pair of upper plates, respectively.

8. The alignment stage according to claim 1, wherein the linear driving source is a linear motor, and a magnetic shielding for shielding an effect of a magnetic field generated from the linear motor is provided.

9. The alignment stage according to claim 1, wherein the linear driving source is a linear motor including a magnet member and a coil member, and two sets of a propulsive force generation source configured from the magnet member and the coil member are arranged on both of right and left directions with respect to a direction of propulsive force.

* * * * *